MULTIPLE MODULE TIME DIVISION MULTIPLEX COMMUNICATION SYSTEM UTILIZING HIGH-LOW SPEED CONVERSION

Filed April 11, 1963 2 Sheets-Sheet 1

INVENTORS.
BARRIE BRIGHTMAN
PAUL K. KAVANAUGH
RICHARD SCOTT
BY George J. Seligsohn
ATTORNEY

United States Patent Office 3,311,706

Patented Mar. 28, 1967

3,311,706

MULTIPLE MODULE TIME DIVISION MULTIPLEX COMMUNICATION SYSTEM UTILIZING HIGH-LOW SPEED CONVERSION

Barrie Brightman and Paul K. Kavanaugh, Webster, and Richard Scott, Pittsford, N.Y., assignors, by mesne assignments, to Stromberg-Carlson Corporation, Rochester, N.Y., a corporation of Delaware Filed Apr. 11, 1963, Ser. No. 272,251
5 Claims. (Cl. 179—15)

Figures 1, 2:
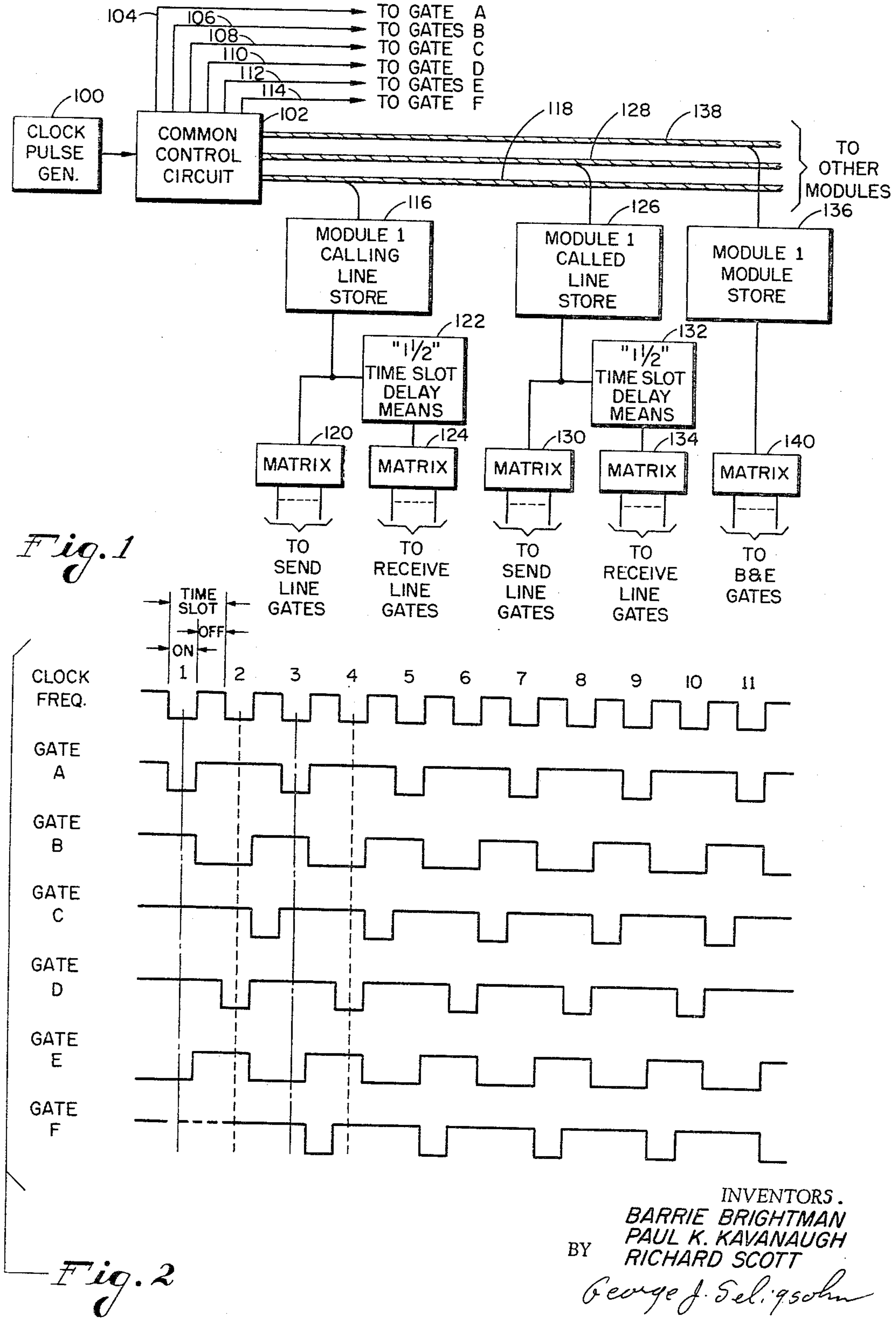

This invention relates to a time division multiplex communication system and, more particularly, to a relatively large time division multiplex communication system composed of a plurality of modules, each of which includes a plurality of line circuits.

Reference is made to copending patent application Ser. No. 45,312, filed July 26, 1960, for Automatic Communication System by W. F. Bartlett et al., now Patent No. 3,134,858, and assigned to the same assignee as the present invention. Patent application Ser. No. 45,312 relates to an electronic private branch exchange in which a particular time slot in a repetitive time frame is allotted to the line circuit of the calling party when a call is initiated. Each line circuit has its own identification number and the identification number of the calling line circuit is stored in a calling line store, composed of recirculating delay lines, in the particular time slot allotted to the calling line circuit. When the calling party dials the identification number of the called line circuit, the called line circuit identification number is detected and stored in a called line store, composed of recirculating delay lines, in the particular time slot allotted to the calling party.

Each of the line circuits is connected to a common transmission highway through respective individual, normally closed, line gates. The output of the calling line store is applied to a calling line matrix which, in turn, causes the line gate of a particular calling party to be opened during the particular time slot allotted to the line circuit of that particular calling party and, simultaneously therewith, the output of the called line store is applied to a called line matrix which, in turn, causes the line gate of the party called by the particular calling party to be opened during the particular time slot allotted to the line circuit of that particular calling party. Therefore, during this particular slot of each time frame, the line circuits of both the calling and called parties are interconnected over the common transmission highway. In a similar manner, other time slots in the time frame may be utilized to interconnect the respective line circuits of other calling parties with the respective line circuits of other called parties.

Since the electronic private branch exchange disclosed in patent application Ser. No. 45,312 includes a relatively small number of line circuits, the actual physical length of the common transmission highway interconnecting the various line gates is quite short. Therefore, no undue distortion of a transmitted sample pulse will take place over the relatively short common transmission highway even if the calling and called line gates are opened for a very short time interval. For instance, in the system disclosed in copending patent application Ser. No. 45,312, each time frame is eighty microseconds long and is divided into thirty-two time slots each having a duration of 2.5 microseconds, each time slot being equally divided between a 1.25 microseconds "on" time portion and a 1.25 microseconds "off" time portion. In other similar systems there is utilized a time frame having a duration of one hundred microseconds, divided into one hundred time slots of one microsecond, each time slot having an "on" time portion of 0.4 microsecond and an "off" time portion of 0.6 microsecond.

The present invention is concerned with a much larger time division multiplex communication system accommodating one thousand or more line circuits. In the large system contemplated by this invention, space and switching requirements make it necessary to divide the system into a plurality of modules, each module including a different group of a plurality of line circuits. In such a system it is necessary to provide space-divided transmission highways interconnecting the various modules. The physical length of these transmission highways may become quite long, extending fifty feet or more. The transmission of an information sample pulse having a duration of less than one microsecond over such a long transmission highway results in distortion of the pulse. However, increasing the duration of transmission by utilizing longer duration time slots limits the number of time slots which can be accommodated within each time frame. It is to solving this problem that this invention is directed.

It is, therefore, an object of the present invention to provide a relatively large time division multiplex communication system incorporating a plurality of modules each including a plurality of different line circuits.

It is a further object of this invention to provide such a system wherein the various line circuits may be sequentially sampled for a relatively short duration of time at a relatively high rate of speed and yet be transferred between modules as relatively long duration samples at a relatively low rate of speed.

It is a further object of this invention to provide in a time division multiplex communication system means for converting high-speed samples to low-speed samples and low-speed samples to high-speed samples.

Figure 3:
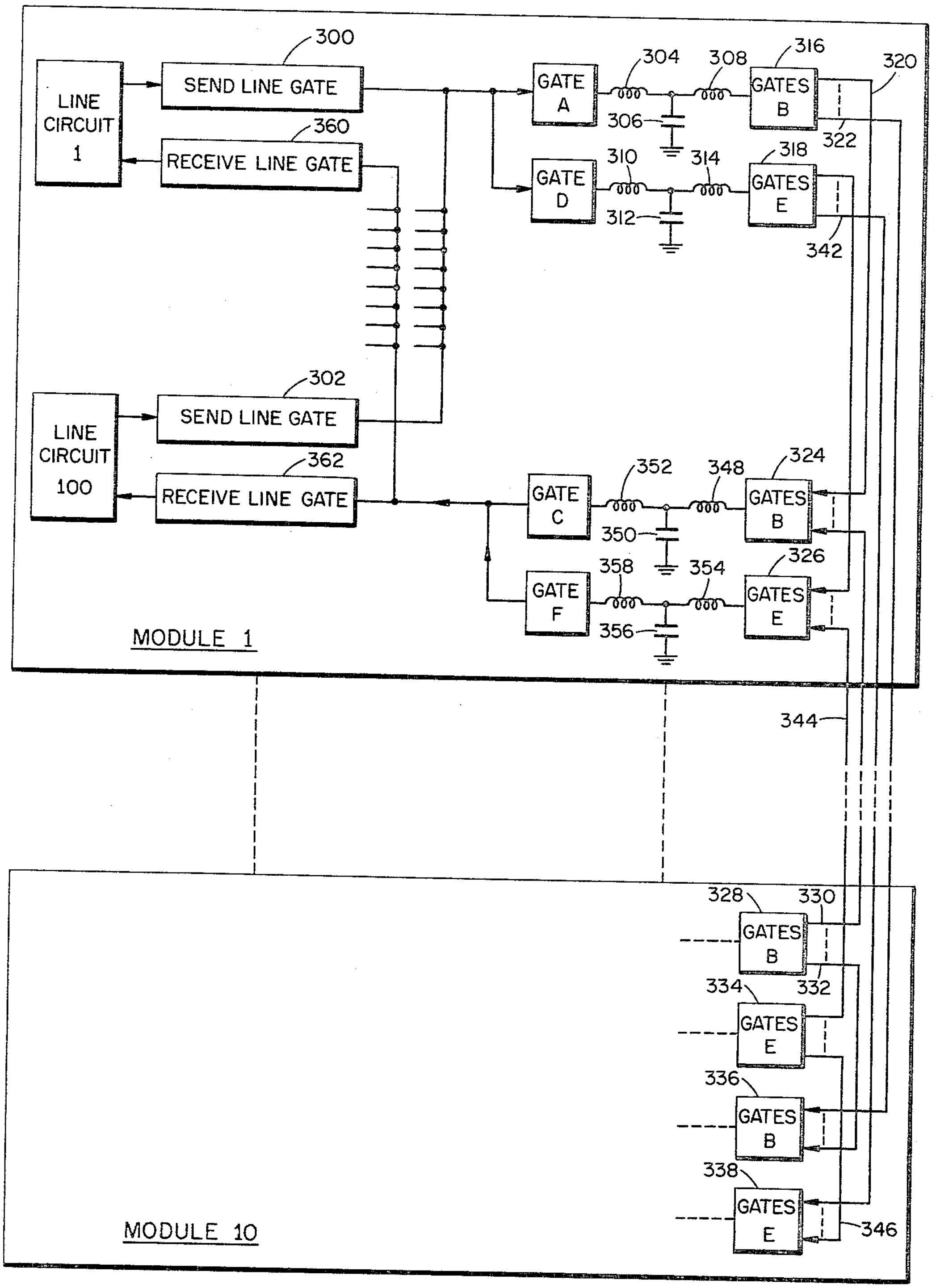

These and other objects, features and advantages of the present invention will become more apparent from the following detailed description taken together with the accompanying drawings in which:

FIG. 1 is a block diagram of a preferred embodiment of control circuitry which is utilized in the present invention, FIG. 2 is a time chart showing the relative occurrences of various control pulses generated by the control circuitry shown in FIG. 1, and FIG. 3 is a block diagram of a preferred embodiment of the circuits included in each of a plurality of line circuit modules.

Referring now to FIG. 1, there is shown clock pulse generator 100 which applied clock pulses to common control circuit 102. Common control circuit 102 will be described in more detail below. However, it does include a pattern generator which is responsive to the clock pulses from clock pulse generator 100 to generate a first waveform on output conductor 104, a second waveform on output conductor 106, a third waveform on output conductor 108, a fourth waveform on output conductor 110, a fifth waveform on output conductor 112, and a sixth waveform on output conductor 114.

Associated with module 1 is module 1 calling line store 116 which receives an input thereto from common control circuit 102 over cable 118. The output from module 1 calling line store is applied directly to matrix 120, which controls the send line gates, and through "1½" time slot delay means 122 to matrix 124, which controls the receive line gates. Also associated with module 1 is module 1 called line store 126 which has an input applied thereto from common control circuit 102 over cable 128. The output of module 1 called line store 126 is applied directly to matrix 130, which controls the send line gates, and through "1½" time slot delay means 132 to matrix 134, which controls the receive line gates. Also associated with module 1 is module 1 module store 136 which has an input applied thereto through common control circuit 102 over cable 138. The output of module 1 module store 136 is applied to matrix 140.

Although only the control circuitry associated with module 1 has been shown, structure identical to elements 116, 120, 122, 124, 126, 130, 132, 134, 136 and 140 is associated with each of nine other modules. The respective inputs to each of the calling line stores of the other nine modules are applied from common control circuit 102 over cable 118, the respective inputs to each of the called line stores of the other nine modules are applied from common control circuit 102 over cable 128, and the respective inputs to each of the module stores of the other nine modules are applied from common control circuit 102 over cable 138.

Referring now to FIG. 3, there are ten modules, only the first and last of which are shown, the structure of each of which is identical.

As shown, module 1 comprises one hundred line circuits, only the first and last of which are shown. Connected to each line circuit is the input of a send line gate, such as the input of send line gate 300 connected to line circuit 1 and the input of send line gate 302 connected to line circuit 100. The outputs of the send line gates of all one hundred line circuits of module 1 are multiplied and connected as an input to both gate A and gate D.

The output of gate A is applied to a first send information storage unit comprising inductance 304, capacitance 306, and inductance 308. The output of gate D is applied to a second send information storage unit comprising inductance 310, capacitance 312, and inductance 314. The output of the first send storage unit is applied in multiple as an input to a plurality of send gates B 316 equal in number to the number of modules, i.e., ten send gates B. The output of the second send storage unit is applied in multiple as an input to a plurality of send gates E 318 equal in number to the number of modules, i.e., ten send gates E.

The respective outputs of send gates B 316 are individually connected over conductors, such as conductors 320 and 322, to the first of receive gates B 324 . . . B 336 in each of the various modules. More particularly, the output of the first of send gates B 316 is applied as an input to the first of receive gates B 324, the output of the second of gates B 316 is applied as an input to the first of gates B of module 2 (not shown) . . . and the output of the tenth of send gates B 316 is applied as an input to the first of receive gates B 336 of the tenth module. In a similar manner, the output of each of the send gates B of the second module (not shown) is applied as an input to the second receive gates B of the various modules . . . and the output of each of the send gates B 328 of the tenth module is applied as an input to the ten receive gates B of the various modules over individual conductors, such as conductors 330 and 332.

Also, in a similar manner, the respective outputs of each of the send gates E, such as send gate E 318 of module 1 and send gate E 334 of module 10, are interconnected with the respective inputs of receive gates E, such as receive gate E 326 of module 1 and receive gate E 338 of module 10 over individual conductors, such as conductors 340, 342, 344 and 346.

The various outputs of receive gates B 324 are connected in multiple to a first receive information storage unit comprising inductance 348, capacitance 350, and inductance 352. In a similar manner, the outputs of receive gates E 326 are connected in multiple as an input to a second receive information storage unit comprising inductance 354, capacitance 356, and inductance 358. The output of the first receive storage unit is applied as an input to gate C and the output of the second receive storage unit is applied as an input to gate F. The output of gate C is applied in multiple as an input to all the receive line gates of module 1, such as receive line gates 360 and 362. The output of the respective receive line gates is connected as an input to its individual line circuit, the output of receive line gates 360 being connected as an input to line circuit 1 and the output of receive line gate 362 being connected as an input to line circuit 100 of module 1.

Referring back to FIG. 1, as set forth above, common control circuit 102 includes a pattern generator which generates first, second, third, fourth, fifth and sixth waveforms, respectively, on conductors 104, 106, 108, 110, 112 and 114, respectively, in response to the clock pulses applied thereto from clock pulse generator 100. In addition, common control circuit 102 includes circuitry, similar to that disclosed in copending application Ser. No. 45,312, which is responsive to the clock pulses from clock pulse generator 100 for generating a plurality of successive time slots which recur in a repetitive time frame.

As shown in FIG. 2, each successive time slot consists of an "on" portion followed by an "off" portion. As shown in the preferred embodiment, the "on" and "off" portions are of equal duration. However, this is not essential and the "on" portion may have a duration which is either more or less than one-half the total duration of the time slot.

As further shown in FIG. 2, the first waveform, which appears on conductor 104 and is applied to gate A, consists of negative pulses isochronous with the "on" portions of all odd time slots. The second waveform, appearing on conductor 106 and applied to gate B, consists of negative pulses isochronous with the "off" portions of all odd time slots and the "on" portions of all even time slots. The third waveform, appearing on conductor 108 and applied to gate C, consists of negative pulses isochronous with the "off" portions of all even time slots. The fourth waveform, appearing on conductor 110 and applied to gate D, consists of negative pulses isochronous with the "on" portions of all even time slots. The fifth waveform, appearing on conductor 112 and applied to gate E, consists of negative pulses isochronous with the "off" portions of all even time slots and the "on" portions of all odd time slots. The sixth waveform, appearing on conductor 114 and applied to gate F, consists of negative pulses isochronous with the "off" portions of all odd time slots.

In addition, common control circuit 102 includes circuitry, basically similar to circuitry disclosed in copending patent application Ser. No. 45,312, responsive to the initiating of a call for allotting a free time slot to a calling line circuit.

Each of the line circuits is identified by a three-digit identity number, the first digit designating the module including that line circuit, and the second and third digits designating the position of that line circuit within the module.

Common control circuit 102 includes circuitry, basically similar to that disclosed in copending application Ser. No. 45,312, for applying the identity number of the calling line circuit over cable 118 to the input of the calling line store associated with the module including the calling line circuit during the "on" portion of the time slot allotted to the calling line circuit. Each of the calling line stores may consist of recirculating delay lines which store the identity number of each calling line circuit in the "on" portion of the time slot allotted to that calling line circuit, and each time frame reproduces, during each time frame, the identity number of each calling line circuit at the output thereof during the "on" portion of the time slot allotted to that calling line circuit.

Common control circuit 102 further includes circuitry, basically similar to that disclosed in copending application Ser. No. 45,312, for detecting the digits of the identity number of the called line circuit dialed by the calling party. Common control circuit 102 further includes logic and delay means responsive to the first detected digit, which manifests the identity of the module including the called line circuit, for applying this first detected digit over cable 138 to the module store associated with the module including the calling line circuit during the "off" portion of the time slot allotted to the calling line circuit and the "on" portion of the time slot next following the time slot allotted to the calling line circuit. The module stores may also consist of recirculating delay lines for reproducing, during each time frame, at the output thereof, information manifesting the module including the called line circuit.

Common control circuit 102 further includes logic means under the control of the first detected digit for applying the second and third detected digits over cable 128 to the called line store associated with the module including the called line circuit for storing the second and third detected digits in this called line store in the "on" portion of the time slot allotted to the calling line circuit. The called line store, which may also consist of recirculting delay lines, reproduces, during each time frame, at the output thereof, the second and third detected digits during the "on" portion of the time slot allotted to the calling line circuit.

The outputs of the calling line store, the called line store, and the module store, respectively, are applied directly to respective matrices, such as matrix 120, matrix 130, and matrix 140. In addition, the outputs of the calling line store and the called line store are applied to matrices, such as matrix 124 and matrix 134, respectively, through "1½" time slot delay means 122 and 132, respectively. Each of the "1½" time slot delay means provides delay equal to the sum of the duration of one entire time slot plus the "on" portion of a time slot. Since, in the preferred embodiment described herein, the "on" portion of a time slot is assumed to be one-half the duration of the time slot, these delay means have been designated "1½" time slot delay means. However, in case the "on" portion of the time slot is more or less than one-half the duration of the time slot, the time slot delay means will then delay the output from the line store to which it is connected somewhat more or less than one and one-half slots.

Each of the matrices, such as matrices 120, 124, 130, 134 and 140, is substantially identical to the calling and terminating line matrices disclosed in copending application Ser. No. 45,312.

From the foregoing, it will be seen that the matrices of the various modules corresponding to matrix 120 and matrix 130, respectively, will produce a mark on a selected one of the outputs thereof during the "on" portion of the time slot allotted to each calling line circuit in accordance with the identity number applied thereto from the calling or called line store to which it is connected. The matrices of the various modules corresponding to matrix 124 and matrix 134 will produce a mark on a selected one of the outputs thereof during the "off" portion of the time slot next following the time slot allotted to each calling line circuit in accordance with the identity number applied thereto from the calling or called line store to which it is connected. The matrices of the various modules corresponding to matrix 140 will produce a mark on a selected one of the outputs thereof during the "off" portion of the time slot allotted to each calling line circuit and the "on" portion of the time slot next following the time slot allotted to each calling line circuit in accordance with the identity number applied to the module store to which it is connected.

Referring back to FIG. 3, and assuming that a calling party at line circuit 1 of module 1 calls a called party at line circuit 100 of module 1 and assuming further that calling line circuit 1 of module 1 is allotted time slot 1, it will be seen from the foregoing that send line gate 300 connected to line circuit 1 will be opened during the "on" portion of the first time slot of each time frame in response to the identity member of line circuit 1 of module 1 appearing then at the output of module 1 calling line store 116 and operating matrix 120 to open send line gate 300 at this time. Further, under the above assumptions, send line gate 302, connected to called line circuit 100, will also be opened during the "on" portion of the first time slot of each time frame in response to the second and third digits of the identity number of line circuit 100 then appearing at the output of module 1 called line store 126, and operating matrix 130 to open send line gate 302 at this time. Further, since time slot 1 is an odd time slot, gate A of module 1 will be opened by the first waveform appearing on conductor 104, which is applied to all gates A. Therefore, a sample of the information appearing on line circuit 1 of module 1 will be transferred during the "on" portion of the first time slot through open send line gate 300 and gate A to the first send information storage unit consisting of inductance 304, capacitance 306, and inductance 308. Simultaneously therewith, a sample of the information appearing on line circuit 100 of module 1 will be transferred through open send line gate 302 and open gate A to the first send storage unit.

During the immediately subsequent "off" portion of the first time slot and the "on" portion of the second time slot, the second waveform appearing on conductor 106 will be applied to all gates B. Also during the "off" portion of the first time slot and the "on" portion of the second time slot, matrix 140 will apply a mark to only the top gate of send gates B 316, send gates E 318, receive gates B 324, and receive gates E 326, all of module 1, in accordance with the first digit of the identity number of the called line circuit appearing at this time at the output of module 1 module store 136. Any one of the various gates B and gates E will be opened only in response to both the application thereto of a mark from matrix 140 and the concurrent application thereto of the second waveform appearing on conductor 106, or the fourth waveform appearing on conductor 110. It will be seen, therefore, that under the assumed conditions, only the top gate of send gates B 316 and receive gates B 324 will be opened during each "off" portion of the first time slot and the "on" portion of the second time slot. Therefore, during the "off" portion of the first time slot and the "on" portion of the second time slot, the stored samples stored by the first send storage unit, consisting of inductance 304, capacitance 306, and inductance 308, will be transferred through the top gate of send gate B 316, over conductor 320, the top gate of receive gates B 324 to the first receive information storage unit, consisting of inductance 348, capacitance 350, and inductance 352.

Under the assumed conditions, receive line gate 360, connected to line circuit 1 of module 1, will be opened during the "off" portion of the second time slot by a mark appearing on a selected output of matrix 124 in accordance with the identity number of the line circuit 1 of module 1 appearing in the output of module 1 calling line store 116 during the "on" portion of first time slot and having been passed through "1½" time slot delay means 122. Also, receive line gate 362, connected to line circuit 100 of module 1, will be opened during the "off" portion of the second time slot by a mark appearing on a selected output of matrix 134 in accordance with the identity number of line circuit 100 of module 1 appearing on the output of module 1 called line store 126 during the "on" portion of the first time slot and having been passed through "1½" time slot delay means 132. Further, gate C will be opened during the "off" portion of the second time slot in response to the third waveform appearing on conductor 108, which is applied to gate C. Therefore, the samples stored by the first receive storage unit, consisting of inductance 348, capacitance 350, and inductance 352, will be transferred through gate C and receive line gate 360 to line circuit 1 of module 1 and through gate C and receive line gate 362 to line circuit 100 of module 1 during the "off" portion of the second time slot.

The above-described transfer of information between line circuits 1 and 100 of module 1 has been made on the assumption that the calling line circuit was allotted time slot 1. The transfer will take place in an identical manner if the calling line circuit is allotted any odd time slot. However, when the calling line circuit is allotted the second time slot, or any other even time slot, the transfer of information takes place over a somewhat different path.

More particularly, during the "on" portion of the second time slot, gate D is opened by the fourth waveform, appearing on conductor 110, applied to gate D rather than gate A. Therefore, assuming that the second time slot has been allotted to the calling line circuit, but that all other assumptions remain the same, during the "on" portion of the second time slot, a sample of the information appearing on line circuit 1 of module 1 will be transferred through send line gate 300 and gate D to the second send information storage unit, consisting of inductance 310, capacitance 312, and inductance 314, and a sample of the information appearing on line circuit 100 of module 1 will be transferred through send line gate 302 and gate D to the second send storage unit. Also during the "off" portion of the second time slot and the "on" portion of the third time slot, the top gate of send gates E 318 and send gates E 326 will be opened to transfer the sample stored by the second send storage unit through the top gate of send gates E 318, over conductor 340, the top gate of receive gates E 326 to the second receive information storage unit, consisting of inductance 354, capacitance 356, and inductance 358. Finally, during the "off" portion of the third time slot gate F, receive line gate 360 and receive line gate 362 will be opened to transfer the samples stored by the second receive storage unit to line circuit 1 and line circuit 100, respectively, of module 1.

Therefore, summarizing, the transfer path for all odd time slots includes gate A, the first send storage unit, gate B, the first receive storage unit, and gate C, while the transfer path for all even time slots includes gate D, the second send storage unit, gate E, the second receive storage unit, and gate F.

From the foregoing, it will be seen that a sample is transferred from a line circuit of any module to the send storage unit of that module in a time interval having a duration equal to only the "on" portion of a time slot; that a sample is transferred from a send storage unit of any module to the receive storage unit of that or any other module in a time interval having a duration equal to the sum of both the "on" and "off" portions of a time slot; and that a sample is transferred from the receive storage unit of any module to a line circuit of that module in a time interval having a duration equal to only the "on" portion of a time slot. Further, it will be seen that in order to accommodate a faster intramodule transfer than intermodule transfer, first send and receive storage units are utilized for transferring samples of calls allotted odd time slots and second separate send and receive storage units are utilized for transferring samples of calls allotted even time slots.

Although only a preferred embodiment of the invention has been disclosed, it is not intended that the invention be restricted thereto, but that it be limited only by the true spirit and scope of the appended claims.

What is claimed is:

1. In a system for transferring an information analog signal from a first of a plurality of line circuits to a second of said plurality of line circuits, comprising a first and a second information storage unit, a third and a fourth information storage unit, first means including a send gate and an output control gate in series for periodically transferring a sample of said signal from said first line circuit to said first storage unit during a first time interval of given duration, second means for transferring said sample stored by said first storage unit to said third storage unit during a second time interval following said first time interval which second time interval is substantially longer in duration than said given duration, and third means including a receive gate and an input control gate in series for transferring said sample stored by said third storage unit to said second line circuit during a third time interval following said second time interval which third time interval is substantially equal in duration to said given duration, said send gate, output control gate, input control gate and receive gate being operated only for said given duration, said send and receive gates operating at twice the frequency of said input and output control gates, fourth means for transferring a sample of a second signal from a third line circuit to said second storage means, fifth means for transferring information stored in said second storage unit to said fourth storage unit during a fourth time interval of substantially equal duration to said second time interval, and sixth means for transferring said sample of said second signal from said fourth storage means to a fourth line circuit.

2. In a system comprising a plurality of modules, each module including a plurality of line circuits, transfer means for transferring an information analog signal between any one and any other line circuits including a first and a second information storage unit in each module, a third and a fourth storage unit in each module, first means including a send gate and an output control gate in series for periodically transferring a sample of said signal appearing on said one of said two line circuits to the first storage unit of that module which includes said one of said two line circuits during a first time interval of given duration, second means for transferring said sample stored by said first storage unit to the third storage unit of that module which includes said other of said two line circuits during a second time interval following said first time interval which second time interval is substantially longer in duration than said given duration, and third means including an input control gate and a receive gate in series for transferring the sample stored by said third storage unit to said other line circuit during a third time interval following said second time interval which third time interval is substantially equal in duration to said given duration said send and receive gates operating at twice the frequency of said input and output control gates, and fourth means for transferring an additional information analog signal between a third line circuit via the send gate and second information storage unit associated therewith to a fourth line circuit via the fourth information storage unit and receive gate associated therewith.

3. In a time division multiplex communication system comprising, first means providing a predetermined number of time slots occurring in a repetitive time frame, each time slot including an on portion immediately followed by an off portion, a plurality of modules each including a plurality of line circuits, each module including first and second send information storage units and first and second receive information storage units, transfer means for transferring a first analog information signal between any first pair of line circuits and for transferring a second analog information signal between any second pair of line circuits, said transfer means including first means for transferring a sample of said first signal appearing on one of said first pair of line circuits to the first send storage unit of the module including said one of said first pair of line circuits during the on portion of any particular time slot, second means for transferring a sample of said second signal appearing on one of said second pair of line circuts to the second send storage unit of the module including said one of said second pair of line circuits during the on portion of the time slot immediately preceding said particular time slot, third means for transferring said sample stored by said first send storage unit to said first receive storage unit of the module including the other of said first pair of line circuits during the off portion of said particular time slot and the on portion of the time slot immediately following said particular time slot, fourth means for transferring said sample stored by said second send storage unit to said second receive storage unit of the module including the other of said second pair of line circuits during the off portion of the time slot immediately preceding said particular time slot and the on portion of said particular time slot, fifth means for transferring said sample stored by said first receive storage unit to said other of said first pair of line circuits during the off portion of the time slot immediately following said particular time slot, and sixth means for transferring said sample stored by said second receive storage unit to said other of said second pair of line circuits during the off portion of said particular time slot.

4. The system defined in claim 3, further including seventh means for transferring a sample of a third analog information signal appearing on said other of said first pair of line circuits to the first send storage unit of the module including said other of said first pair of line circuits during the on portion of said particular time slot, eighth means for transferring a sample of a fourth analog information signal appearing on said other of said second pair of line circuits to the second send storage unit of the module including said other of said second pair of line circuits during the on portion of the time slot immediately preceding said particular time slot, ninth means for transferring the sample stored by said second-mentioned first send storage unit to the first receive storage unit of the module including said one of said first pair of line circuits during the off portion of said particular time slot and the on portion of the time slot immediately following said particular time slot, tenth means for transferring the sample stored by said second-mentioned second send storage unit to the second receive storage unit of the module including said one of said second pair of line circuits during the off portion of the time slot immediately preceding said particular time slot and the on portion of said particular time slot, eleventh means for transferring the sample stored by said second-mentioned first receive storage unit to said one of said first pair of line circuits during the off portion of the time slot immediately following said particular time slot, and twelfth means for transferring the sample stored by said second-mentioned second receive storage unit to said one of said second pair of line circuits during the off portion of said particular time slot.

5. The system defined in claim 3, wherein at least said one or the other of said first pair of line circuits is included in the same module as at least said one or the other of said second pair of line circuits.

References Cited by the Examiner

UNITED STATES PATENTS

| | | | |
|---|---|---|---|
| 2,962,551 | 11/1960 | Johannesen | 179—15 |
| 2,962,552 | 11/1960 | Crowley | 179—15 |

DAVID G. REDINBAUGH, *Primary Examiner.*

ROBERT L. GRIFFIN, *Examiner.*